United States Patent [19]
Bleickardt et al.

[11] Patent Number: 5,461,622
[45] Date of Patent: Oct. 24, 1995

[54] METHOD AND APPARATUS FOR USING SONET OVERHEAT TO ALIGN MULTIPLE INVERSE MULTIPLEXED DATA STREAMS

[75] Inventors: Werner H. Bleickardt; John O. Eaves, both of Middletown, N.J.; Joseph C. Lau, Shelton Township, Conn.

[73] Assignee: Bell Communications Research, Inc., Livingston, N.J.

[21] Appl. No.: 259,418

[22] Filed: Jun. 14, 1994

[51] Int. Cl.$^6$ .................................................. H04J 3/06
[52] U.S. Cl. ........................... 370/84; 370/99; 370/102; 370/105.1; 370/112
[58] Field of Search ..................... 370/55, 56, 84, 370/99, 100.1, 102, 105.1, 105.3, 106, 108, 110.1, 112; 375/116, 117, 118; 359/115, 118, 135

[56] References Cited

U.S. PATENT DOCUMENTS

| | | | |
|---|---|---|---|
| 5,033,044 | 7/1991 | Williams et al. | 370/105.1 |
| 5,040,170 | 8/1991 | Upp et al. | 370/99 |
| 5,142,529 | 8/1992 | Parruck et al. | 370/84 |
| 5,257,261 | 10/1993 | Parruck et al. | 370/84 |
| 5,315,594 | 5/1994 | Noser | 370/110.1 |
| 5,331,641 | 7/1994 | Parruck et al. | 370/102 |

OTHER PUBLICATIONS

Rodney J. Boehm, "SONET: A Standard Optical Interface Emerges," *Telephony*, Apr. 4, 1988, pp. 54–57.
Ralph Ballart and Yau–Chau Ching, "SONET: Now It's the Standard Optical Network," *IEEE Communications Magazine*, Mar. 1989, pp. 8–15.
You–Chau Ching and Grant W. Cyboron, "Where is SONET?," *IEEE, LTS*, Nov. 1991, pp. 44–51.

*Primary Examiner*—Alpus Hsu
*Attorney, Agent, or Firm*—Leonard Charles Suchyta; Stephen M. Gurey

[57] ABSTRACT

A super-rate signal is split (213) by an inverse multiplexer (200) into plural SONET STS-1 signals for transmission over separate facilities. At the receiver (500) the plural received signals are likely to have misaligned frames and payloads within the frames. In order to realign the plural signals so that they can be properly recombined to reform the original super-rate signals, the SONET A1 and A2 framing bytes together with the H1 and H2 pointer bytes are extracted (506) and used to determine (507) from where in plural buffers (508) stored frames of each received signal should be read out so that the read out signals are properly aligned. If misalignment of greater than one frame is to be corrected, plural frames of each received signal are stored and the SONET J1 byte is used in conjunction with the framing and pointer bytes to properly align the signals.

18 Claims, 5 Drawing Sheets

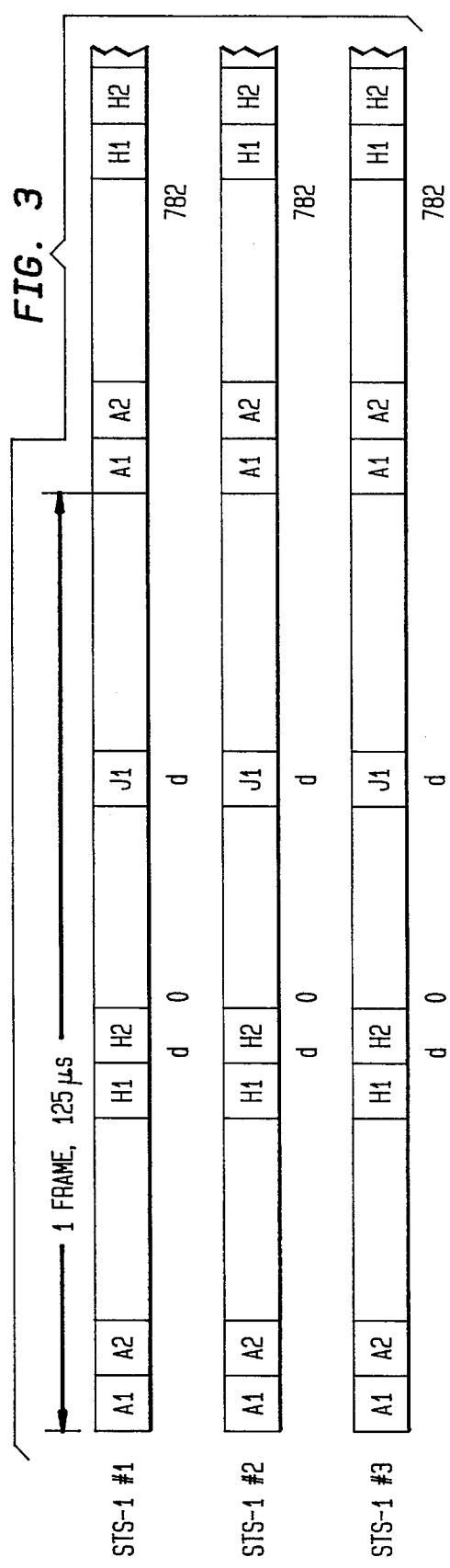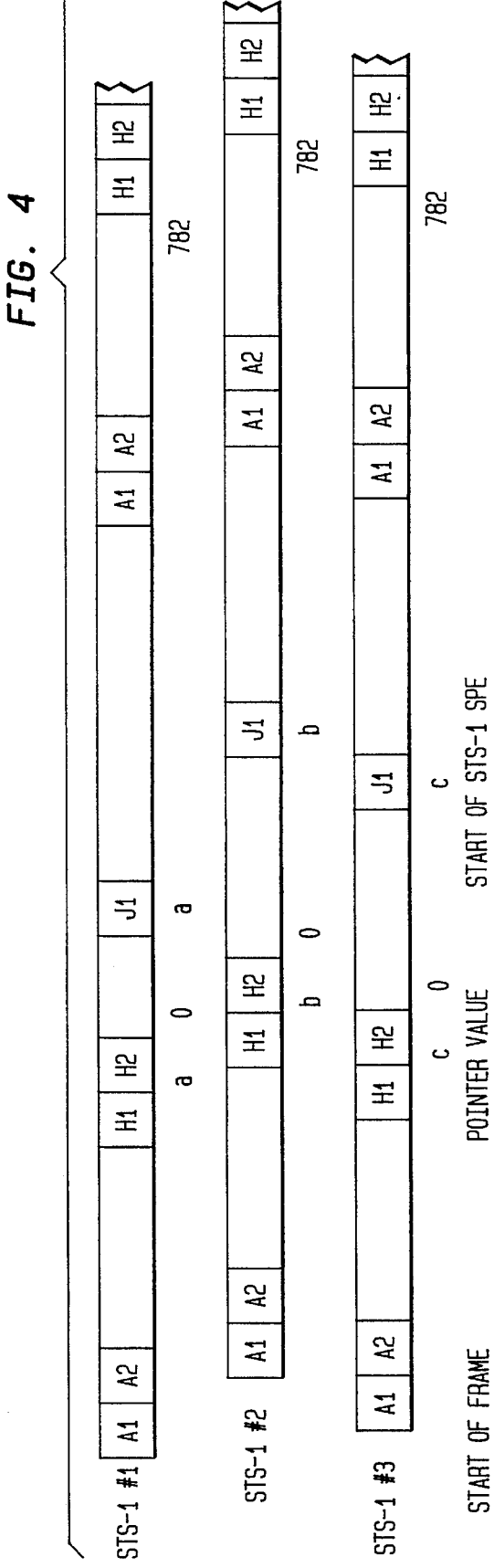

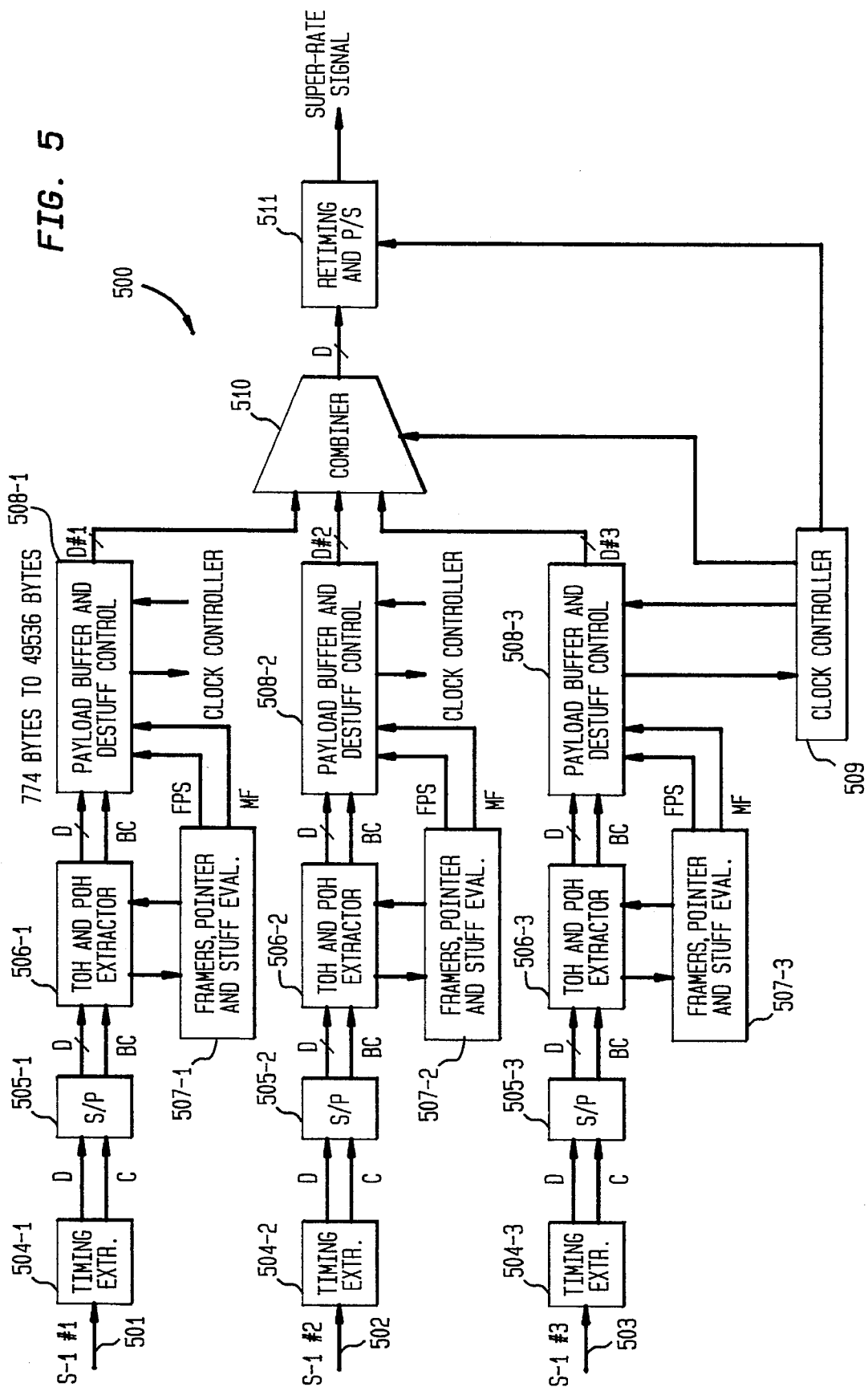

METHOD AND APPARATUS FOR USING SONET OVERHEAT TO ALIGN MULTIPLE INVERSE MULTIPLEXED DATA STREAMS

BACKGROUND OF THE INVENTION

This invention relates to data transmission and, more particularly, to high speed data transmission over the Synchronous Optical Network (SONET).

Inverse multiplexers are currently available that enable higher speed signals to be transmitted over available lower speed channels. Specifically, various inverse multiplexers are available in the marketplace that take a contiguous bandwidth signal larger than 56 or 64 Kb/s, and break it down into N parts that can each be transmitted over a 56 or 64 Kb/s DS0 channel. After transmission over T1 transmission facilities, an inverse multiplexer at the receiving end realigns and recombines the N individual signals and outputs the original contiguous bandwidth signal. This process can be called virtual concatenation of N 56 or 64 Kb/s signals and is used to provide a variety of signal bandwidths that are required for data and video transmission but are not available through the public network. Many terminal equipment suppliers offer such equipment in a fast growing market. They all use supplier-proprietary schemes to coordinate the virtual concatenation between the transmitting and receiving ends to manage operation and maintenance. For example, markers are put on the separate signals and are used at the receiving end to properly recombine the signals. Specifically, since the separate signals are likely to be transmitted over different transmission facilities which each impose different transmission delays on the separate signals, the separate received signals must be properly phase aligned at the receiver before they can be recombined. By identifying the marker in each separate received signal, the signals can be phase aligned and recombined in a proper manner. Because of the proprietary schemes used, inverse multiplexers from different suppliers are generally not end-to-end compatible.

In addition to the inverse multiplexers noted above that virtually concatenate N 56 or 64 Kb/s signals, inverse multiplexers are appearing that virtually concatenate N DS1 (1.544 Mb/s) signals that can be used to transmit contiguous bandwidth signals larger than 1.5 Mb/s over multiple T1 transmission lines. Larger bandwidths are again adapted to available channels in the public network. Obviously, the trend is toward higher and higher speed digital transport networks and concomitant with that is the need to transmit at speeds even higher than the networks can accommodate in a single channel. This permits transmission of higher speed contiguous bandwidth signals that do not map into existing channels or that precede the availability of higher speed channels. Thus, even as optical fibers become the transport medium for high-speed digital signals, inverse multiplexing will be required to transmit signals having bandwidths greater than the bandwidth of a single channel.

As optical fibers replace electrical conductors for high-speed digital transport, equipment that complies with adopted SONET standards will be available. SONET standards have been adopted to allow fiber optics transmission systems of one manufacturer to optically interconnect with those of any other manufacturer, and for equipment of different manufacturers to be mixed and matched. SONET standards define standard optical signals, a synchronous frame structure for multiplexed digital traffic, and operations procedures (see, e.g., Rodney J. Boehm, "SONET: A Standard Optical Interface Emerges," *Telephony*, Apr. 4, 1988, pp. 54–57; Ralph Ballart and Yau-Chau Ching, "SONET: Now It's the Standard Optical Network," *IEEE Communications Magazine*, March 1989, pp. 8–15; and Yau-Chau Ching and Grant W. Cyboron, "Where is SONET?," *IEEE LTS*, November 1991, pp. 44–51).

The basic SONET signal, called an STS-1, or Synchronous Transport Signal-Level 1, has a rate of ≈50 Mb/s. The STS-1 signal defines a multiplexing technique and interface parameters. Each STS-1 signal is a byte-oriented structure that is repeated every 125 msec, with each byte defining a 64 Kb/s channel. The basic signal has a portion of bandwidth set aside for transmission management purposes (transport overhead) that is common among all signals. The other part of the bandwidth (information payload) is designated to be defined in any manner necessary to allow transport of information signals. FIG. 1 shows the format of an STS-1 frame consisting of 90×9=810 bytes. Each frame includes 27 bytes of transport overhead and a Synchronous Payload Envelope (SPE) consisting of 87×9=783 bytes of which 774 bytes are payload bytes and 9 bytes are path overhead bytes. Included in the 27 bytes of transport overhead are framing bytes A1 and A2 which define the frame, and pointer bytes H1 and H2 which point to where the SPE begins. The SPE, beginning with the J1 byte in the path overhead, can float anywhere following the H1-H2-H3 overhead bytes. Each frame, defined as beginning with the A1–A2 framing bytes, is therefore not byte contiguous with its SPE, as can be noted in the figure, since the J1 byte can slide from the byte after H3 until the byte before H1 following the next A1–A2 framing bytes.

The ability for the SPE to float is part of the SONET system mechanism incorporated to permit slight variations in phase and frequency to be accommodated as the STS-1 signal is transmitted through the network and passes through many network elements. In particular, as the signal passes through a network element, the SPE and the pointer to the location of that SPE can slide forward or backward by one position to accommodate a phase or frequency variation. After passing through many network elements between a transmitting and a receiving end, therefore, the location of SPE can significantly differ from its original position.

A SONET inverse multiplexer that virtually concatenates SONET signals is envisioned to serve the same purpose as the previously described lower speed inverse multiplexers. The SONET inverse multiplexer will thus break down super-rate signals into multiple STS-1 signals for transport over the current STS-1 based network, or in the future, break down even faster super-rate signals into multiple STS-3c, or faster, signals for transport over a future STS-3c based network. The STS-3c based network has a rate of ≈155 Mb/s and the STS-3c signal consists of three concatenated STS-1 format signals.

As with currently available lower speed inverse multiplexers, a SONET-speed inverse multiplexer which virtually concatenates plural STS-1 signals (or higher rate signals on an STS-3c or higher speed network) into an original even higher super-rate signal, must include means for realigning the multiple STS-1 signals so they can be properly combined in a byte-by-byte manner. As previously described, as each component STS-1 signal is separately transmitted over different transmission facilities, it will likely encounter different delays that must be compensated for at the receiving end. In a SONET network, transmission of the component STS-1 signals is likely to produce two distinct effects: firstly, the beginning of each frame in each STS-1 component signal, defined by the A1 and A2 bytes, is likely to be misaligned; and secondly, the SPE in each STS-1 component signal is likely to be offset from its original position, with the offset being different in each separate STS-1 signal.

SONET rate signals could be realigned using marker signals embedded in the payload of each data stream, in the same manner prior art inverse multiplexers realign component signals. Disadvantageously, unless the particular marker signals are standardized, equipment from different suppliers would be incompatible. Furthermore, use of a portion of the payload for transmission of a marker signal decreases the efficiency of information transmission.

An object of the present invention is to realign and combine multiple SONET rate signals at the receiving end of an inverse multiplexer in a manner that does not rely on particular marker signals embedded in the payload of each component data stream, and which is efficient from a transmission standpoint.

SUMMARY OF THE INVENTION

In accordance with the present invention, existing SONET overhead is used to provide the information that enables multiple SONET data streams to be properly recombined at the receiving end of an inverse multiplexed super-rate data signal. In particular, the A1 and A2 framing bytes together with the H1 and H2 pointer bytes are used to realign the multiple component data streams. Specifically, the A1 and A2 SONET framing bytes are first used to align the frames in the multiple data streams and then, once frame aligned, the H1 and H2 pointer bytes are used the align the SPEs within the multiple data streams. If the frame misalignment is known to be greater than one frame, then the content of the J1 byte, which repeats a specific pattern with a 64 frame period, is used to realign the frames in the component signals for up to a 64 frame misalignment.

At the receiving end of the inverse multiplexer, the plural STS-1 signals are read into plural associated buffers as the framing bytes, A1 and A2, the pointer bytes, H1 and H2, and the content of the J1 byte (if frame misalignment may be greater than one frame) are processed. By knowing exactly where the payload of each frame actually begins from the content of the H1 and H2 bytes and, if necessary, the J1 byte, the plural signals stored in their associated buffers, are read out in a synchronized manner so that the payloads in each signal are aligned in time. The aligned payloads are then combined byte-by-byte to form the original super-rate signal.

BRIEF DESCRIPTION OF THE DRAWING

FIG. 3 shows the timing relationship between the framing bytes, the pointer bytes, and the J1 byte at the front-end of the SPE of the three STS-1 signals at the transmitter;

FIG. 4 shows the timing relationship between the framing bytes, the pointer bytes and the J1 byte of the same three STS-1 signals as they are received by the receiver of the SONET inverse multiplexer;

FIG. 5 is a block diagram of the receiver of the SONET inverse multiplexer in accordance with the present invention, which realigns the three received STS-1 signals and recombines them into the original super-rate signal.

DETAILED DESCRIPTION

Figure 1:
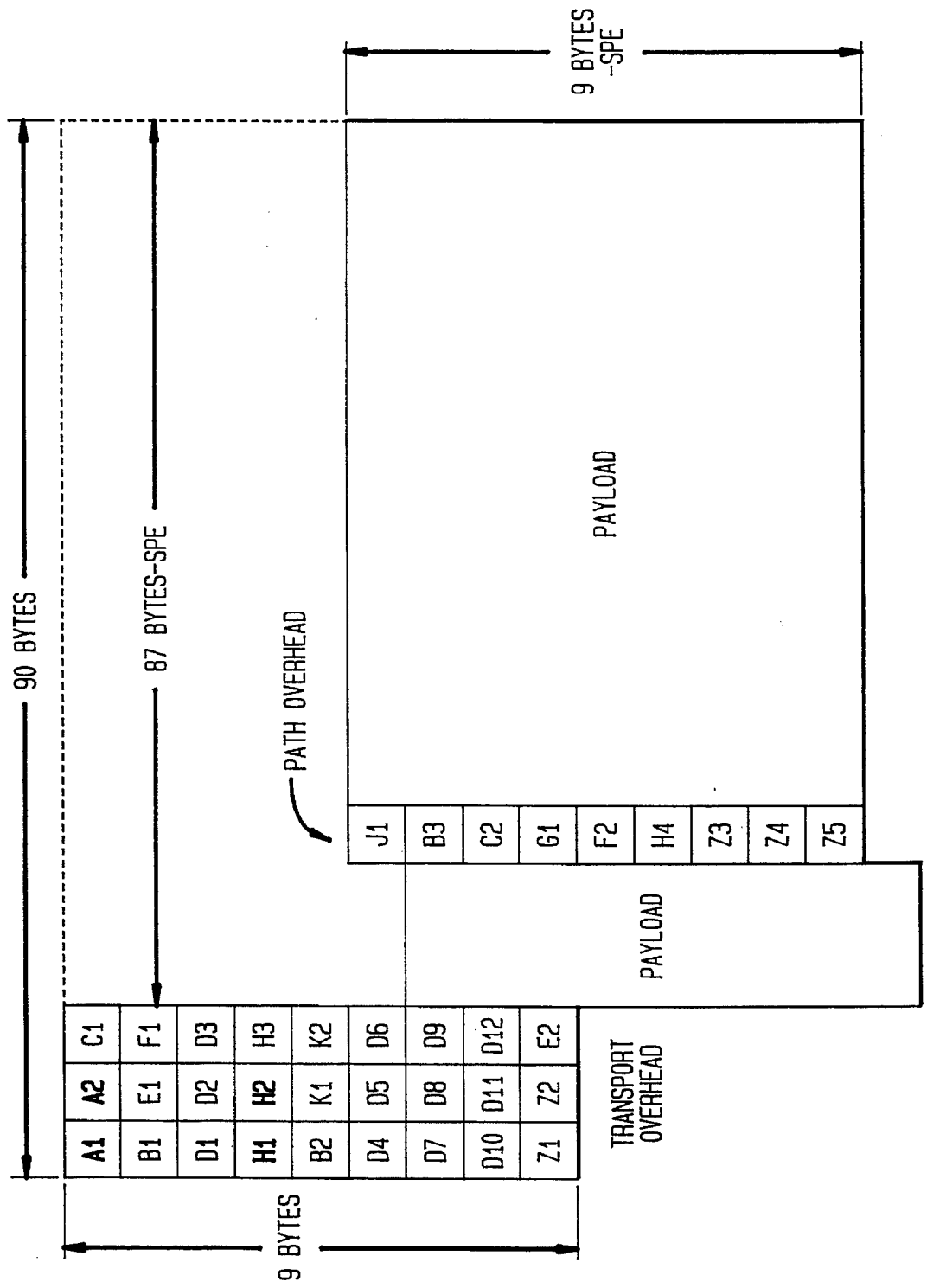
FIG. 1 shows the STS-1 frame structure.
Figure 2:
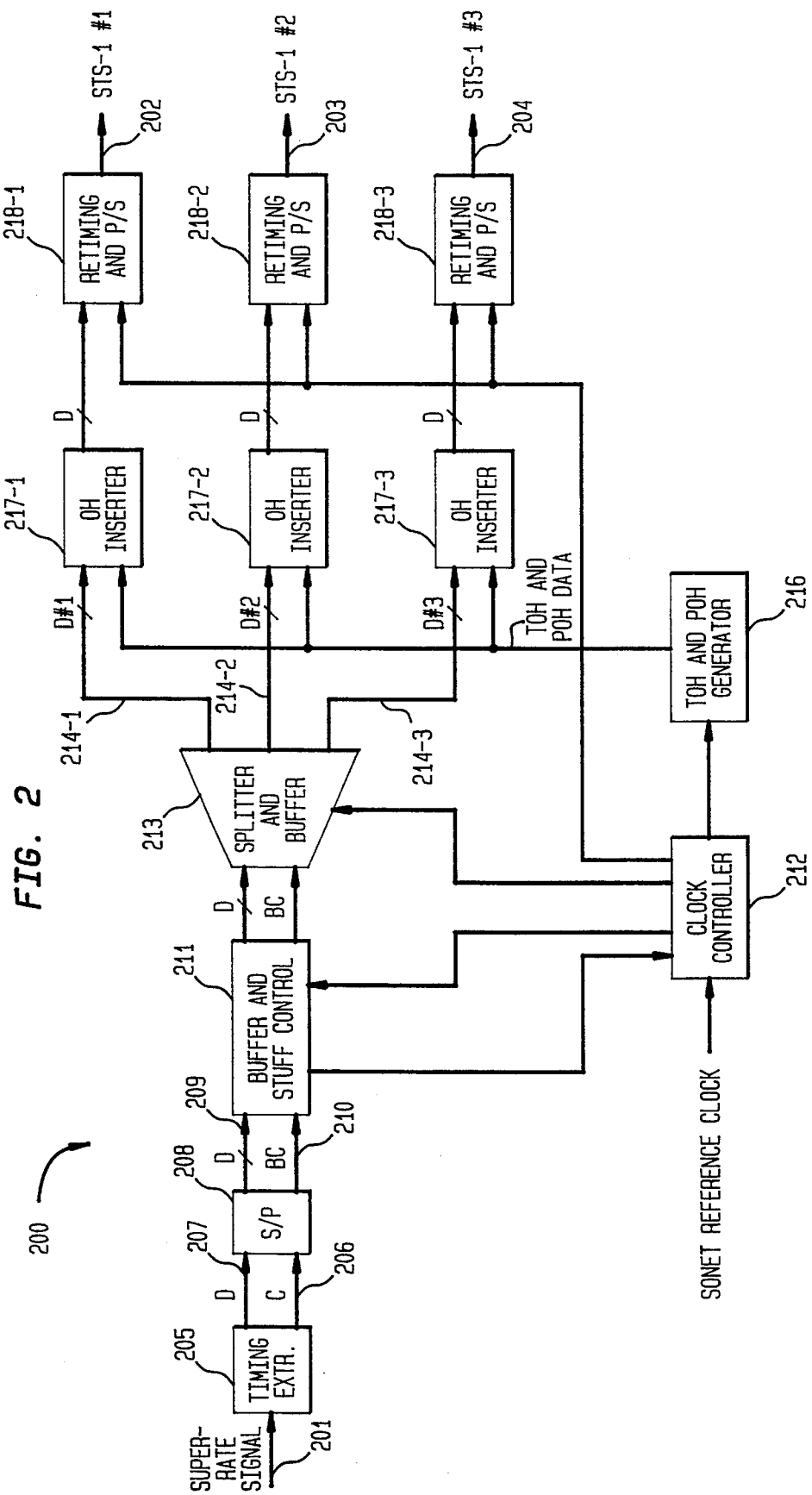
FIG. 2 is a block diagram of the transmitter of a SONET inverse multiplexer in accordance with the present invention, which converts a super-rate signal into three STS-1 signals for separate transmission.

With reference to FIG. 2, the transmitter 200 of a SONET inverse multiplexer is shown in which a super-rate input signal on input 201 is transmitted over three STS-1 signals on outputs 202, 203 and 204, respectively. Since the payload of each STS-1 signal is equal to 49.536 Mb/s (774 bytes×8 bits/byte×8 KHz), the super-rate input signal must be less than or equal to 3×49.536 Mb/s, equal to 148.608 Mb/s. In a more general case, the super-rate signal would be transmitted over N STS-1 signals and must then be at a rate less than or equal to N×49.536 Mb/s. The super-rate signal may be asynchronous in the general case, and the N STS-1 signals are synchronized to a SONET Reference Clock. In special cases, the super-rate signal may be an exact multiple of the STS-1 payload, i.e. N×49.536 Mb/s, and synchronous to the SONET Reference Clock, simplifying the inverse multiplexer structure.

The super-rate signal on 201 at for example, 120 Mb/s, is inputted to a timing extractor circuit 205, which extracts the timing from incoming signal and produces a clock C output on 206 and a serial bit data output D on 207. Serial-to-parallel converter 208 converts the serial bit stream into a parallel byte stream on eight parallel data D leads 209 while also outputting a byte clock, BC, on lead 210 at ⅛ the rate of the bit clock, C.

The data bytes and the byte clock are then input to a buffer and stuff control circuit 211. Buffer and stuff control circuit 211 is responsive to a clock controller 212 to which is input the SONET Reference Clock. The SONET Reference Clock is a synchronous reference clock which may be derived from a Building Integrated Timing Supply (BITS) or another reference. Buffer and stuff control circuit 211 adjusts the transmission rate between the input super-rate signal and the payload of 3×49.536 Mb/s on the three output STS-1 signals on 202–204. Stuffing must be utilized to increase the super-rate signal to match 3×49.536 Mb/s. The buffer and stuff control 211 inserts stuffing bytes accordingly, as well as a Stuffing Indicator byte for use at the receiving end to control proper destuffing.

Stuffing consists of two components: a certain number of fixed stuffing bytes and a single variable stuffing byte per STS-1 frame. That certain number of fixed stuffing bytes is set once in the transmitter and in the receiver when the system is provisioned for a certain super-rate signal. The number and placement of these stuffing bytes remains fixed thereafter. The number can be anywhere between 0 and approximately 772, depending on whether the super-rate signal is at the same or a lower rate than 3×49.536 Mb/s. For the super-rate signal of 120 Mb/s used in the embodiment of FIG. 2, the payload per frame per STS-1 signal required to support this rate can be calculated to be 625 bytes. The 149 remaining bytes thus need to be used for stuffing purposes. Conceptually, the fixed stuffing bytes may be placed at the end of the SPE, not including the very last byte.

The variable stuffing byte serves for the remaining fine adjustment between the rate of the super-rate signal and 3×49.536 Mb/s, which includes jitter and wander components. This part of the stuffing mechanism is the same in principle as has been used in asynchronous transmission systems for many years. This one variable stuffing byte per STS-1 frame is in a fixed location per frame, for example, in the very last byte location of the SPE. Whether or not the byte in this location is stuffed or contains information depends on the buffer fill and varies from frame to frame. The Stuffing Indicator byte conveys a binary message from the transmitter to the receiver indicating whether or not the byte is being stuffed. The Stuffing Indicator byte itself can be placed in the first byte of the SPE or in an unused overhead byte, employing an error-correcting code.

In the special case where the rate of the super-rate signal is an exact multiple of the STS-1 payload (3×49.536 Mb/s for the example in FIG. 2) and synchronous to the SONET Reference Clock, the buffer and stuff control circuit 211 can be eliminated completely, thereby simplifying the transmitter. No stuffing is required in this case and the normal pointer processing mechanism will take care of the fine adjustments for jitter and wander, just as in a regular SONET system.

For the super-rate signal of 120 Mb/s used in the embodiment of FIG. 2, the payload per frame per STS-1 signal required to support this rate can be calculated to be 625 bytes. The 149 remaining bytes thus need to be used for stuffing purposes. Fixed stuffing bytes occupy 147 positions in each payload in positions known to the transmitter and receiver. These fixed stuffing bytes are thus inserted by buffer and stuff control 211 in each frame in these predetermined fixed positions. One byte is a variable stuffing byte used, as aforenoted for fine adjustment. This byte is either stuffed or not in each frame at a fixed position, as determined by the buffer and stuff control 211. The Stuffing Indicator byte, occupying the last vacant position and inserted by the buffer and stuff control 211, signals the receiver as to whether or not the variable stuffing byte is stuffed or contains information.

The stuffed-up super-rate signal is outputted by buffer and stuff control circuit 211 on its D parallel data output leads, with the byte clock being outputted on its byte clock BC output lead. The composite data and stuffing bytes outputted by buffer and stuff control circuit 211 are inputted in parallel data format to a splitter and buffer 213. Splitter and buffer 213 splits its input bytes onto three sets of parallel data D rails, 214-1, 214-2 and 214-3, rotating the sequential bytes at the output of buffer and stuff control 211 byte-by-byte between the three rails. In addition, splitter and buffer 213 inserts spaces in each output so that overhead bytes can be added that are aligned between the rails.

In response to clock signals generated by clock controller 212, transport overhead (TOH) and path overhead (POH) generator 216 generates the transport overhead bytes and path overhead bytes that need to be inserted in each frame. These bytes include the frame reference bytes (A1 and A2), the multiframe reference bytes (J1), and the payload reference pointer bytes (H1 and H2). All the overhead bytes are aligned and inserted into the byte streams in the three rails in the predetermined byte locations by overhead (OH) inserters 217-1–217-3. The framing bytes A1 and A2 are aligned between the rails and the pointer bytes H1 and H2 are fixed and are identical between the rails; thus the path overhead bytes (starting with the J1 bytes) are also aligned between the rails. The byte parallel data D outputs of OH inserters 217-1–217-3 are inputted to retiming and parallel-to-serial (P/S) circuits 218-1–218-3, respectively. These circuits, each connected to clock controller 212, drive the three STS-1 outputs on 202, 203 and 204, as retimed by the STS-1 clock. In addition, these circuits convert the input parallel byte stream into a serial bit stream for transmission.

The three STS-1 output bit stream signals, shown for example in FIG. 3, are aligned in time both with respect to framing via the A1 and A2 bytes, and with respect to the location of the SPE in each frame, as pointed to by the H1 and H2 bytes. As the three signals are transmitted to their destination over different transmission facilities, these signals are likely to loose both frame alignment and SPE alignment.

FIG. 4 shows the timing relationships between the three STS-1 signals that are received at the far end of the transmission path. As shown in the figure, the beginnings of each frame, defined by the A1 and A2 bytes in each of the three received signals are not aligned and the pointers in each signal point to SPEs which begin at different byte locations within the STS-1 frame. In order to recombine the three STS-1 signals into a single bit stream to reform the original super-rate signal, therefore, both the frames and the SPEs of the three received STS-1 signals need to be realigned.

With reference to the block diagram of the SONET inverse multiplexer receiver 500 shown in FIG. 5, the three received STS-1 signals on inputs 501, 502 and 503 are inputted to timing extractors 504-1–504-3, respectively. These received STS-1 signals are likely to have both misaligned frames and misaligned pointers for the reasons previously described. Each timing extractor extracts the timing from the incoming signal to provide both a data D serial output bit stream and a clock C output at the STS-1 bit rate. The data D output and the clock C output of each timing extractor, 504-1–504-3, is inputted to a serial-to-parallel (S/P) converter, 505-1–505-3, respectively. Each S/P converter converts the input data bit stream and bit clock signal to a parallel data byte steam output and a byte clock, BC, output.

The data byte and byte clock outputs of each S/P converter, 505-1–505-3, are inputted to a TOH and POH extractor, 506-1–506-3, respectively. Each TOH and POH extractor, 506-1–506-3, in conjunction with an associated framers, pointer and stuff evaluator, 507-1–507-3, respectively, extracts and evaluates the transport overhead bytes, the path overhead bytes and the Stuffing Indicator byte within each received input STS-1 frame. Specifically, after each TOH and POH extractor, 506-$i$ ($i$=1–3), extracts the overhead bytes and Stuffing Indicator byte in the received STS-1 signal, the corresponding framers, pointer and stuff evaluator, 507-$i$, locates the beginning of the frame based on the A1 and A2 bytes and then, from the H1 and H2 pointer bytes, locates the beginning of the payload within the frame. If the receiver is to correct for up to a 64 multiframe misalignment, then evaluator 507-$i$ also examines the content of the J1 path overhead byte. In addition, evaluator 507-$i$ evaluates the Stuffing Indicator byte to control proper destuffing.

The signals provided to the D outputs and the BC byte clock outputs of each extractor 506-$i$ are the same as their D and BC inputs. The FPS output of each evaluator 507-$i$ is the framing, pointer and stuffing information determined from the extracted overhead bytes and Stuffing Indicator byte used for realigning and destuffing the received signals. Specifically, the FPS output provides the information for locating the beginning of each frame, the location of payload, and whether the variable stuffing byte is or is not stuffed in the payload. The MF output provides the multiframe information derived from the content of the J1 byte for determining the number of frames of misalignment in the received signal. The D and BC outputs of each extractor 506-$i$, and the FPS and MF outputs of each evaluator 507-$i$ are inputted to a corresponding payload buffer and destuff control, 508-$i$.

Each payload buffer and destuff control 508-$i$ is a large addressable buffer having many storage locations, that realigns the payloads between the rails based on the framers, pointer, and stuffing information and the multiframe information (FPS and MF). The FPS and MF signals inputted to each payload buffer and stuff control 508-$i$ are passed to a clock controller 509 which in turn allows only non-overhead and non-stuffed bytes to be read into the each buffer 508-$i$. Specifically, by passing the FPS information to clock controller 509, clock controller 509 locates the beginning of each frame and the beginning of the SPE in each rail, and from that information knowns where all the overhead bytes and fixed stuffing bytes are located. Also, FPS indicates whether the variable stuffing byte is stuffed or not in the frame. From this information, clock controller 509 inhibits all the overhead bytes, all the fixed stuffing bytes, and the variable stuffing byte, if stuffed, from being read into each buffer 508-$i$. Read into each buffer and destuff control 508-$i$ are therefore only the payload data bytes in each STS-1 signal.

In order for the receiver to be capable of handling up to a 64 frame misalignment in timing between the three rails, each buffer 508-$i$ need be large enough to store 64 frames worth of payload bytes, or 64×774=49,536 bytes. By knowing the relative misalignment of the three rails of payload information from the FPS and MF signals passed from each evaluator 507-$i$, clock controller 509 adjusts the delay from read-in to read-out of each payload buffer and destuff control 508-$i$ so that the payload outputs of each buffer are properly aligned. Specifically, controller 509 determines from which byte storage location each buffer should be read out so that the payloads of all the rails are aligned. If the receiver is capable of handling misalignment in timing between the rails of only one frame or less, then each payload buffer and destuff control 508-$i$ only stores one frame of payload bytes, or 774 bytes. The content of the J1 byte in each frame is not evaluated and each evaluator 507-$i$ does not output the MF indicator.

Clock controller 509 derives a smooth clock at the original rate of the super-rate signal from the payload buffers and destuff controls 508-1–508-3, for use for combining the three parallel data rails outputted from the buffers. The byte parallel outputs from payload buffer and destuff controls 508-1–508-3 are inputted to a combiner 510 which combines bytes from the three aligned rails into a single byte stream, rotating byte-by-byte between the rails. Retiming and parallel-to-serial circuit 511 drives the output that is retimed by the derived super-rate signal clock, and which is converted from a byte stream to the original bit stream at the super-rate signal.

Although the super-rate signal in the embodiment described hereinabove is split into three data rails for transmission on three STS-1 signals, higher speed super-rate signals could similarly be split into any plural number of STS-1 signals. Furthermore, if the input super-rate signal is already referenced to the SONET Reference Clock, it may be at a rate that is an exact multiple of the STS-1 payload rate and would then not require the described stuffing mechanism to "fill-up" the frame. Also, if the super-rate signal is not an exact multiple, but is still referenced to the SONET clock, only a predetermined fixed number of stuffing bytes need be inserted in each frame thereby eliminating the need for a variable stuffing byte component and Stuffing Indicator in each frame. In both of these cases the SONET pointer mechanism itself is sufficient to compensate for natural wander and jitter. The TOH and POH extractor in the receiver obviously would not extract a Stuffing Indicator byte.

Figure 6:
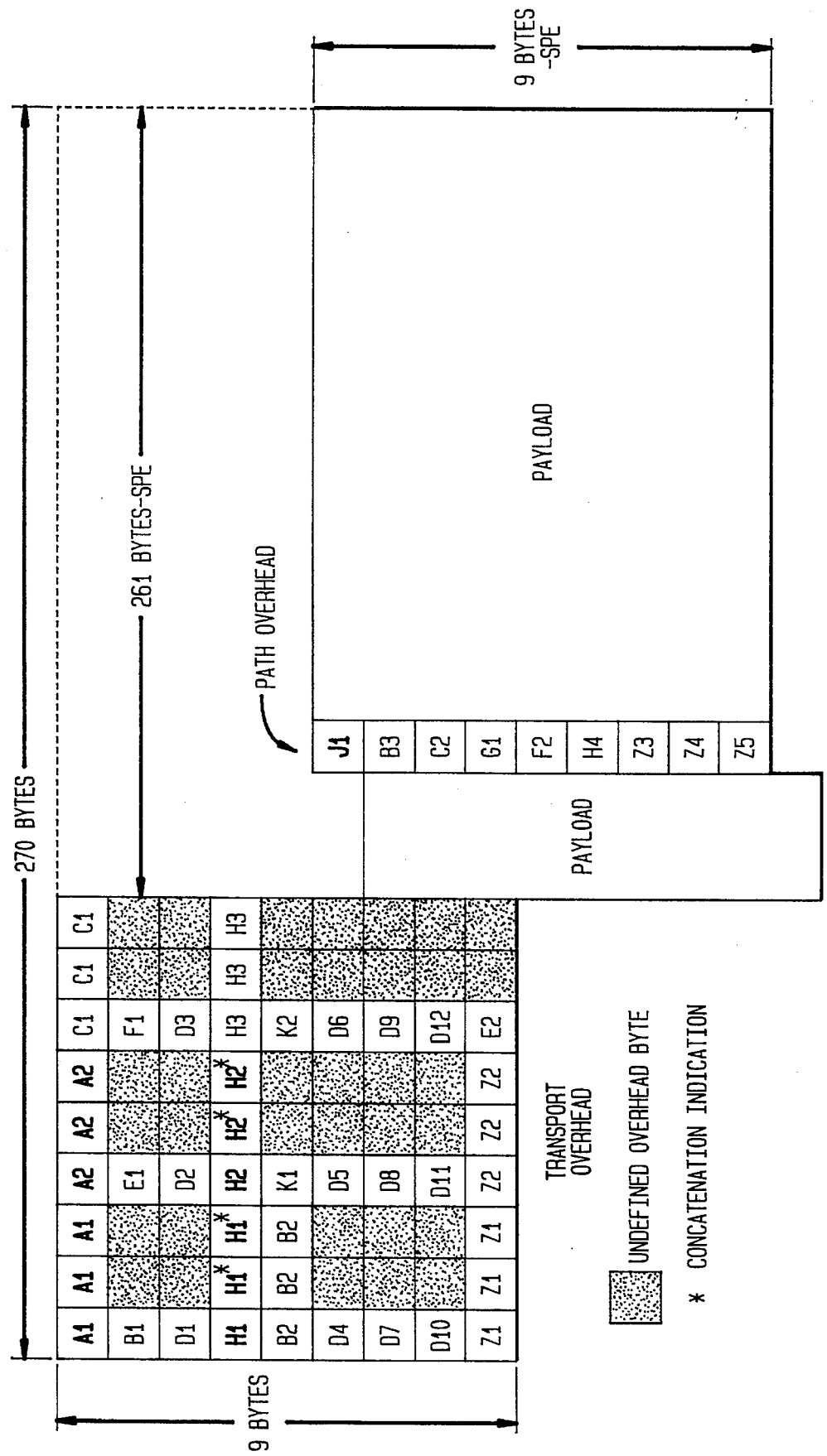
FIG. 6 shows the STS-3c frame structure.

The present invention need not be limited to the transmission of super-rate signals on plural STS-1 SONET signals. The invention could readily be extended to the next and higher SONET levels. FIG. 6 shows the STS-3$c$ frame structure, which consists of three concatenated STS-1 frames, at a rate of 155.520 Mb/s. A super-rate signal at greater than the payload rate (149.760 Mb/s) of the STS-3$c$ signal could be split and transmitted on plural STS-3$c$ signals. The A1 and A2 framing bytes in conjunction with the H1 and H2 byte pointer values and the content of the J1 byte in each of the plural received STS-3$c$ signals are used in the same manner as aforedescribed to realign these plural signals within up to a 64 frame misalignment.

The above-described embodiments are illustrative of the principles of the present invention. Other embodiments could be devised by those skilled in the art without departing from the spirit and scope of the present invention.

What is claimed is:

1. In a system which splits a super-rate signal into plural lower-rate SONET signals and separately transmits those plural SONET signals to a receiver which combines the separately received SONET signals to reform the super-rate signal, each SONET signal being in a frame format having a fixed number of bytes per frame and each frame having a fixed number of transport overhead (TOH) bytes and a Synchronous Payload Envelope (SPE) which contains a fixed number of path overhead (POH) bytes and a fixed number of payload bytes, the beginning of the SPE of the frame being slidably locatable at a plurality of byte locations, the TOH bytes including framing bytes (A1 and A2) which define the beginning of each frame and pointer bytes (H1 and H2) which point to the location of the beginning of the SPE in the frame, the beginning of the SPE of the frame being locatable at a plurality of byte locations relative to the H1 and H2 pointer bytes, the first byte in the SPE being a multiframe reference byte (J1) in the POH which repeats a predetermined pattern every fixed number of frames, a method for combining the plural received SONET signals to reform said super-rate signal comprising the steps of:

extracting the A1 and A2 framing bytes and the H1 and H2 pointer bytes in each of the plural received SONET signals;

determining the beginning of each frame from the extracted A1 and A2 framing bytes and the beginning of the SPE in each frame from the extracted H1 and H2 pointer bytes in each of the plural received SONET signals;

separately storing a fixed number of bytes of the payload from each of the plural received SONET signals;

using the extracted A1 and A2 framing bytes and H1 and H2 pointer bytes from each received SONET signal to determine byte storage locations from where the stored payloads of each of the plural received SONET signals are read-out so that the read out payloads of all of the plural received SONET signals are aligned in time; and reading out the stored payloads of each of the plural received SONET signals from the determined byte storage locations;

combining the aligned read-out payloads of each of the plural received SONET signals to reform the super-rate signal.

2. The method of claim 1 wherein the fixed number of payload bytes stored from each of the plural received SONET signals is equal to the number of payload bytes in a frame.

3. The method of claim 1 further comprising the steps of:

extracting the J1 multiframe reference byte in each of the plural received SONET signals;

determining the number of frames each of the plural received SONET signals are misaligned in time from each other from the extracted J1 multiframe reference bytes; and using the determined number of frames each of the plural received SONET signals are misaligned in time from each other together with the extracted A1 and A2 framing bytes and H1 and H2 pointer bytes to determine the byte storage locations from where the stored payloads of each of the plural received SONET signals are read-out so that the read out payloads of each of the plural received SONET signal are aligned in time.

4. The method of claim 3 wherein the fixed number of payload bytes stored from each of the plural received SONET signal is less than or equal to the product of number of payload bytes in a frame and the fixed number frames over which the J1 multiframe reference byte repeats its predetermined pattern.

5. The method of claim 1 wherein fixed stuffing bytes are in fixed locations within the payload in each frame of each of the plural received SONET signals, the method further comprising the steps of:

determining the locations of the stuffing bytes within the payloads of each of the plural received SONET signals from the extracted A1 and A2 framing bytes and H1 and H2 pointer bytes; and using the determined locations of the stuffing bytes within the payloads of each of the plural received SONET signals to inhibit storage of stuffing bytes from the payloads of each of the plural received SONET signals.

6. The method of claim 5 wherein a Stuffing Indicator byte is located in a fixed location of each frame of each of the plural received SONET signals, the Stuffing Indicator byte in each frame indicating whether a stuffing byte is located in a fixed location in the payload of the associated frame, the method further comprising the steps of:

extracting the Stuffing Indicator byte in each frame of each of the plural received SONET signals;

determining from the Stuffing Indicator byte whether a stuffing byte is located in the fixed location in the payload of the associated frame; and inhibiting from storing the byte located in the fixed location in the payload of the associated frame if the Stuffing Indicator byte indicates that the byte in that fixed location is a stuffing byte.

7. The method of claim 1 wherein the SONET signals are SONET Synchronous Transport Signal-Level 1 (STS-1) signals.

8. The method of claim 1 wherein the SONET signals are SONET concatenated Synchronous Transport Signal-Level 3 (STS-3c) signals.

9. The method of claim 1 wherein the SONET signals are concatenated integer multiples of SONET STS-1 signals.

10. In a system which splits a super-rate signal into plural lower-rate SONET signals and separately transmits those plural SONET signals to a receiver which combines the separately received SONET signals to reform the super-rate signal, each SONET signal being in a frame format having a fixed number of bytes per frame and each frame having a fixed number of transport overhead (TOH) bytes and a Synchronous Payload Envelope (SPE) which contains a fixed number of path overhead (POH) bytes and a fixed number of payload bytes, the beginning of the SPE of the frame being slidably locatable at a plurality of byte locations, the TOH bytes including framing bytes (A1 and A2) which define the beginning of each frame and pointer bytes (H1 and H2) which point to the location of the beginning of the SPE in the frame, the beginning of the SPE of the frame being locatable at a plurality of byte locations relative to the H1 and H2 pointer bytes, the first byte in the SPE being a multiframe reference byte (J1) in the POH which repeats a predetermined pattern every fixed number of frames, the receiver for combining the plural received SONET signals to reform said super-rate signal comprising:

plural receiving means each for receiving an associated one of the separately transmitted SONET signals;

plural extracting means each for extracting the A1 and A2 framing bytes and the H1 and H2 pointer bytes in an associated one of the plural received SONET signals;

plural determining means each for determining the beginning of each frame from the extracted A1 and A2 framing bytes and the beginning of the SPE in each frame from the extracted H1 and H2 pointer bytes in an associated one of the plural received SONET signals;

plural storage means each for separately storing in byte storage locations a fixed number of bytes of the payload from an associated one of the plural received SONET signals;

control means responsive to the determined beginning of each frame and the beginning of each SPE in each of the plural received SONET signals for determining from which byte storage locations in each of the plural storage means the stored payloads of each of the plural received SONET signals are read-out, said control means causing each of the plural storage means to be read out from the determined byte storage locations so that the read out payloads of each of the plural received SONET signals are aligned in time; and means for combining the aligned read-out payloads of each of the plural received SONET signal to reform the super-rate signal.

11. The receiver of claim 10 wherein each of the plural storage means stores a fixed number of payload bytes equal to the number of payload bytes in a frame.

12. The receiver of claim 10 wherein each of the plural means for extracting extracts the J1 multiframe reference byte in each of the plural received SONET signals, each of the plural means for determining determines the number of frames each of the plural received SONET signals are misaligned in time from each other from the extracted J1 multiframe reference bytes; and the control means in response to the number of frames each of the plural received SONET signals are misaligned in time from each other together with the extracted A1 and A2 framing bytes and H1 and H2 pointer bytes locates from where in each of the plural storage means the stored payloads of each of the plural received SONET signals are read-out so that the read-out payloads of all of the plural received SONET signals are aligned in time.

13. The receiver of claim 12 wherein the fixed number of payload bytes stored from each of the plural received SONET signal by each of the plural storage means is less than or equal to the product of the number of payload bytes in a frame and the fixed number frames over which the multiframe reference byte J1 repeats its predetermined pattern.

14. The receiver of claim 10 wherein fixed stuffing bytes are in fixed locations within the payload in each frame of each of the plural received SONET signals, said plural determining means also determining from the extracted A1 and A2 framing bytes and the extracted H1 and H2 pointer bytes the locations of the stuffing bytes within the payloads of each of the plural received SONET signals and using these determined locations of the stuffing bytes to inhibit stuffing bytes from the payloads of each of the plural received SONET signal from being stored.

15. The receiver of claim 14 wherein a Stuffing Indicator byte is located in a fixed location of each frame of each of the plural received SONET signals, the Stuffing Indicator byte in each frame indicating whether a stuffing byte is located in a fixed location in the payload of the associated frame, said plural extracting means extracting the Stuffing Indicator byte in each frame of each of the plural received SONET signals, and said plural determining means also determining from the Stuffing Indicator byte whether a stuffing byte is located in the fixed location in the payload of the associated frame and inhibiting from storing that byte in the fixed location of the payload if the Stuffing Indicator byte indicates that the byte in that fixed location is a stuffing byte.

16. The receiver of claim 10 wherein the SONET signals are SONET Synchronous Transport Signal-Level 1 (STS-1) signals.

17. The receiver of claim 10 wherein the SONET signals are SONET concatenated Synchronous Transport Signal-Level 3 (STS-3c) signals.

18. The receiver of claim 10 wherein the SONET signals are concatenated integer multiples of STS-1 signals.

* * * * *

UNITED STATES PATENT AND TRADEMARK OFFICE
CERTIFICATE OF CORRECTION

PATENT NO. : 5,461,622
APPLICATION NO. : 08/259418
DATED : October 24, 1995
INVENTOR(S) : Werner H. Bleickardt et al.

It is certified that error appears in the above-identified patent and that said Letters Patent is hereby corrected as shown below:

ON THE FIRST PAGE

In the title delete "OVERHEAT" and replace with -- OVERHEAD --.

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

PATENT NO. : 5,461,622  
APPLICATION NO. : 08/259418  
DATED : October 24, 1995  
INVENTOR(S) : Werner H. Bleickardt et al.

It is certified that error appears in the above-identified patent and that said Letters Patent is hereby corrected as shown below:

ON THE TITLE PAGE, Item (54) and Column 1, line 2,

In the title delete "OVERHEAT" and replace with -- OVERHEAD --.

This certificate supersedes the Certificate of Correction issued September 22, 2009.

Signed and Sealed this

Twenty-sixth Day of January, 2010

David J. Kappos  
*Director of the United States Patent and Trademark Office*